US008326781B2

United States Patent
Kugler (10) Patent No.: US 8,326,781 B2
(45) Date of Patent: Dec. 4, 2012

(54) METHOD FOR THE COMPRESSED TRANSMISSION OF DATA PACKET HEADER FIELDS IN A PACKET-ORIENTED DATA STREAM, METHOD FOR COMPRESSING DATA PACKET HEADER FIELDS IN A PACKET-ORIENTED DATA STREAM, METHOD FOR DECOMPRESSING DATA PACKET HEADER FIELDS IN A PACKET-ORIENTED DATA STREAM, COMPRESSION/DECOMPRESSION SYSTEM, COMPRESSION APPARATUS AND DECOMPRESSION APPARATUS (75) Inventor: Martin Kugler, Poing (DE)

(73) Assignee: Intel Mobile Communications GmbH, Neubiberg (DE)

( * ) Notice: Subject to any disclaimer, the term of this patent is extended or adjusted under 35 U.S.C. 154(b) by 830 days.

(21) Appl. No.: 12/233,605

(22) Filed: Sep. 19, 2008

(65) Prior Publication Data

US 2009/0086762 A1    Apr. 2, 2009

(30) Foreign Application Priority Data

Sep. 27, 2007 (DE) .......................... 10 2007 046 364

(51) Int. Cl.
*G06E 1/00* (2006.01)
*G06E 3/00* (2006.01)
*G06F 15/18* (2006.01)
*G06G 7/00* (2006.01)

(52) U.S. Cl. ................ 706/21; 706/15; 706/16; 706/17; 706/18; 706/22

(58) Field of Classification Search .................. None
See application file for complete search history.

(56) References Cited

U.S. PATENT DOCUMENTS 5,577,028 A * 11/1996 Chugo et al. .................. 370/409

(Continued)

FOREIGN PATENT DOCUMENTS

DE    10143102 A1    8/2002

OTHER PUBLICATIONS

A new voice transformation method based on both linear and non-linear prediction analysis Ki Seung Lee; Dae Hee Youn; Il Whan Cha; Spoken Language, 1996. ICSLP 96. Proceedings., Fourth International Conference on vol. 3, Oct. 3-6, 1996 pp. 1401-1404 vol. 3 Digital Object Identifier 10.1109/ICSLP.1996.607876.

(Continued)

*Primary Examiner* — Omar Fernandez Rivas (57) ABSTRACT

In various embodiments, a method for compressed transmission of data packet header fields in a packet-oriented data stream may comprise: estimating in advance a data packet header field in a packet-oriented data stream from at least one preceding data packet header field; forming a piece of comparison information which indicates the difference between the data packet header field and the data packet header field estimated in advance using the transmitter neural network; transmitting the comparison information as a compressed data packet header field from the transmitter to a receiver; estimating in advance the data packet header field from at least one already transmitted data packet header field in the packet-oriented data stream using the receiver neural network; and generating the data packet header field from the data packet header field estimated in advance using the neural network of the receiver and from the transmitted piece of comparison information.

23 Claims, 3 Drawing Sheets

U.S. PATENT DOCUMENTS

| | | | | |
|---|---|---|---|---|
| 6,483,845 | B1* | 11/2002 | Takeda et al. | 370/429 |
| 6,819,681 | B1* | 11/2004 | Hariharasubrahmanian | 370/498 |
| 6,961,777 | B1* | 11/2005 | Hariharasubrahmanian | 709/230 |
| 2002/0097701 | A1* | 7/2002 | Lupien et al. | 370/338 |
| 2004/0202167 | A1* | 10/2004 | Jonsson et al. | 370/392 |
| 2005/0254515 | A1 | 11/2005 | Suzuki et al. | |

OTHER PUBLICATIONS

Modular neural predictive coding for discriminative feature extraction Chetouani, M.; Gas, B.; Zarader, J.; Acoustics, Speech, and Signal Processing, 2003. Proceedings. (ICASSP '03). 2003 IEEE International Conference on vol. 2, Apr. 6-10, 2003 pp. II-33-6 vol. 2 Digital Object Identifier 10.1109/ICASSP.2003.1202287.

Fully vector-quantized neural network-based code-excited nonlinear predictive speech coding Lizhong Wu; Niranjan, M.; Fallside, F.; Speech and Audio Processing, IEEE Transactions on vol. 2, Issue 4, Oct. 1994 pp. 482-489 Digital Object Identifier 10.1109/89.326608.

Nonlinear prediction of speech Townshend, B.; Acoustics, Speech, and Signal Processing, 1991. ICASSP-91., 1991 International Conference on Apr. 14-17, 1991 pp. 425-428 vol. 1 Digital Object Identifier 10.1109/ICASSP.1991.150367.

Non-linear short-term prediction in speech coding Thyssen, J.; Nielsen, H.; Hansen, S.D.; Acoustics, Speech, and Signal Processing, 1994. ICASSP-94., 1994 IEEE International Conference on vol. i, Apr. 19-22, 1994 pp. I/185-I/188 vol. 1 Digital Object Identifier 10.1109/ICASSP.1994.389324.

Discriminative coding with predictive neural networks Chavy, C.; Gas, B.; Zarader, J.L. Artificial Neural Networks, 1999. ICANN 99. Ninth International Conference on (Conf. Publ. No. 470) vol. 1, Issue , 1999 pp. 216-220 vol. 1 Digital Object Identifier.

Low-loss TCP/IP header compression for wireless networks Degermark, M.; et. al.: Wireless Networks, vol. 3, No. 5, 1997, pp. 375-387 (13); Springer.

Dr A Saxena, G Panda, P K Dash, Lossless Data Compression using Neural Networks Institution of Engineers (India), Journal—CP, vol. 86, Nov. 2005, pp. 65-70, http://www.ieindia.org/pdf/86/pcn5fl5.pdf.

Slaven Marusic, Guang Deng, A neural network based on adaptive non-linear lossless predictive coding technique, ISSPA 1999, Proceedings of the Fifth International Symposium on, vol. 2, Aug. 1999, pp. 653-656, IEEE Xplore.

N. Sriraam, R. Kannan, C. Eswaran Lossless compression of EEG data using neural network predictors, ICONIP 2002, Proceedings of the 9th International Conference on, vol. 4, Nov. 2002, pp. 2046-2048, IEEE Xplore.

English language abstract of DE 101 43 102 A1.

* cited by examiner

METHOD FOR THE COMPRESSED TRANSMISSION OF DATA PACKET HEADER FIELDS IN A PACKET-ORIENTED DATA STREAM, METHOD FOR COMPRESSING DATA PACKET HEADER FIELDS IN A PACKET-ORIENTED DATA STREAM, METHOD FOR DECOMPRESSING DATA PACKET HEADER FIELDS IN A PACKET-ORIENTED DATA STREAM, COMPRESSION/DECOMPRESSION SYSTEM, COMPRESSION APPARATUS AND DECOMPRESSION APPARATUS

TECHNICAL FIELD

The invention relates to a method for the compressed transmission of data packet header fields in a packet-oriented data stream, a method for compressing data packet header fields in a packet-oriented data stream, a method for decompressing data packet header fields in a packet-oriented data stream, a compression/decompression system, a compression apparatus and a decompression apparatus.

When transmitting data which contain redundant information, for example repetitive or similar code strings, it is generally desirable not to transmit the redundant information several times. This allows the complexity for the data traffic to be reduced, for example the utilization level of a transmission link with limited transmission capacity can be reduced. In particular, it is desirable, by way of example, not always to completely retransmit repetitive or similar data packet header fields in a packet-oriented data stream.

BRIEF DESCRIPTION OF THE SEVERAL VIEWS OF THE DRAWINGS

Exemplary embodiments of the invention are illustrated in the figures and are explained in more detail below.

DETAILED DESCRIPTION OF THE INVENTION

Where applicable, the description of an apparatus pertains in similar fashion to the relevant method and vice versa.

Figure 1:
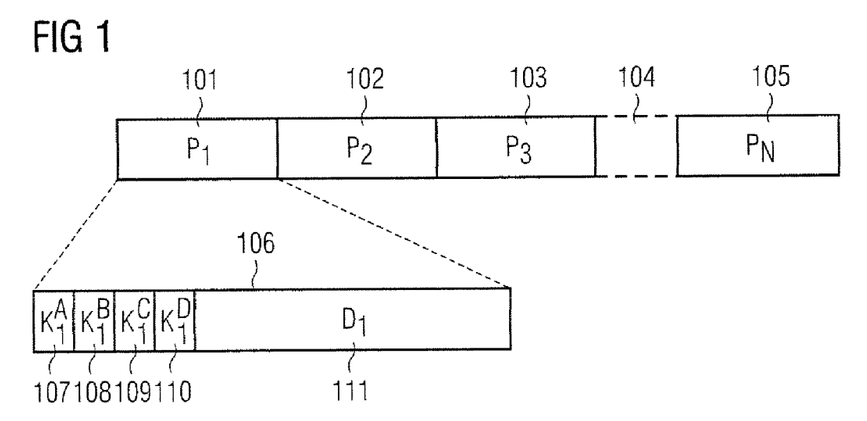
FIG. 1 shows a packet-oriented data stream based on an exemplary embodiment of the invention.

FIG. 1 shows a packet-oriented data stream which is transmitted from a mobile radio network to a mobile communication appliance, for example.

The data stream shown comprises a series or succession of N data packets. It starts with a first data packet "P1" 101. This is followed by a second data packet "P2" 102, a third data packet "P3" 103 and a series of further data packets 104, which is merely indicated in the figure. The data stream ends with the Nth data packet "PN" 105.

The structure of the data packets is shown in more detail using the example of the first data packet "P1" 101 in an enlarged detail 106. In packet-oriented data traffic, each packet comprises one or more header fields, what are known as headers (data packet header or data packet header field; the term header is subsequently also used synonymously with data packet header field) and a data portion, what is known as the payload. In the exemplary data stream, the first data packet contains four successive header fields, namely "K1A" 107, "K1B" 108, "K1C" 109 and "K1D" 110. These data packet header fields are followed by the data portion "D1" 111.

The further data packets are of identical or similar design. The number and length of the header fields and the length of the data portions may be the same for all the data packets in this case or else may vary. A variation pattern may repeat itself after a certain number of data packets.

One exemplary embodiment of the invention provides a method for the compressed transmission of data packet header fields in a packet-oriented data stream. The method comprises: advance estimation of a data packet header field in a packet-oriented data stream from at least one preceding data packet header field in the packet-oriented data stream using a neural network of a transmitter, formation of a piece of comparison information which indicates the difference between the data packet header field and the data packet header field estimated in advance using the neural network of the transmitter, transmission of the piece of comparison information as a compressed data packet header field from the transmitter to a receiver, advance estimation of the data packet header field from at least one already transmitted data packet header field in the packet-oriented data stream using a neural network of the receiver, and generation of the data packet header field from the data packet header field estimated in advance using the neural network of the receiver and from the transmitted piece of comparison information.

One exemplary embodiment of the invention provides a method for compressing data packet header fields in a packet-oriented data stream. The method comprises: advance estimation of a data packet header field in a packet-oriented data stream from at least one preceding data packet header field in the packet-oriented data stream using a neural network, and formation of a piece of comparison information which indicates the difference between the data packet header field and the data packet header field estimated in advance, as a compressed data packet header field.

One exemplary embodiment of the invention provides a method for decompressing data packet header fields in a packet-oriented data stream. The method comprises: reception of a piece of comparison information as a compressed data packet header field in a packet-oriented data stream, and advance estimation of the data packet header field from at least one already received data packet header field in the packet-oriented data stream using a neural network, and generation of the data packet header field from the data packet header field estimated in advance and the received piece of comparison information.

In line with one exemplary embodiment of the invention, a compression/decompression system has the following: a first neural network, set up for the advance estimation of a data packet header field in a packet-oriented data stream from at least one preceding data packet header field in the packet-oriented data stream, a comparison unit, set up for forming a piece of comparison information which indicates the difference between the data packet header field and the data packet header field estimated in advance using the first neural network, a transmission link, set up for transmitting the piece of comparison information as a compressed data packet header field, a second neural network, set up for the advance estimation of the data packet header field from at least one already transmitted data packet header field in the packet-oriented data stream, and a reconstruction unit, set up for generating the data packet header field from the data packet header field estimated in advance using the second neural network and from the transmitted piece of comparison information.

In line with one exemplary embodiment of the invention, a compression apparatus has the following: a neural network, set up for the advance estimation of a data packet header field in a packet-oriented data stream from at least one preceding data packet header field in the packet-oriented data stream, and a comparison unit, set up for forming a piece of comparison information which indicates the difference between the data packet header field and the data packet header field estimated in advance, as a compressed data packet header field.

In line with one exemplary embodiment of the invention, a decompression apparatus has the following: a reception unit, set up for receiving a piece of comparison information as a compressed data packet header field in a packet-oriented data stream, a neural network, set up for the advance estimation of the data packet header field from at least one already received data packet header field in the packet-oriented data stream, and a reconstruction unit, set up for generating the data packet header field from the data packet header field estimated in advance and the received piece of comparison information.

In line with one exemplary embodiment of the invention, the data traffic between a mobile radio network and a mobile communication appliance can be minimized on the air interface by compressing one or more headers (header fields) in the data packets before transmission and decompressing it/them after reception.

By way of example, this compression and decompression can be used for the mobile radio generation 3GPP ("3rd Generation Partnership Project") both in the GPRS system ("General Packet Radio Service"), particularly in the SNDCP protocol layer ("Subnetwork Dependent Convergence Protocol"), and in the UMTS system ("Universal Mobile Telecommunication System"), particularly in the PDCP protocol layer ("Packet Data Convergence Protocol").

In line with further exemplary embodiments of the invention, the data traffic can be minimized generally for appliances which use a packet-oriented data stream to interchange information or data with other appliances, for example, in the case of what are known as routers.

Figure 2:
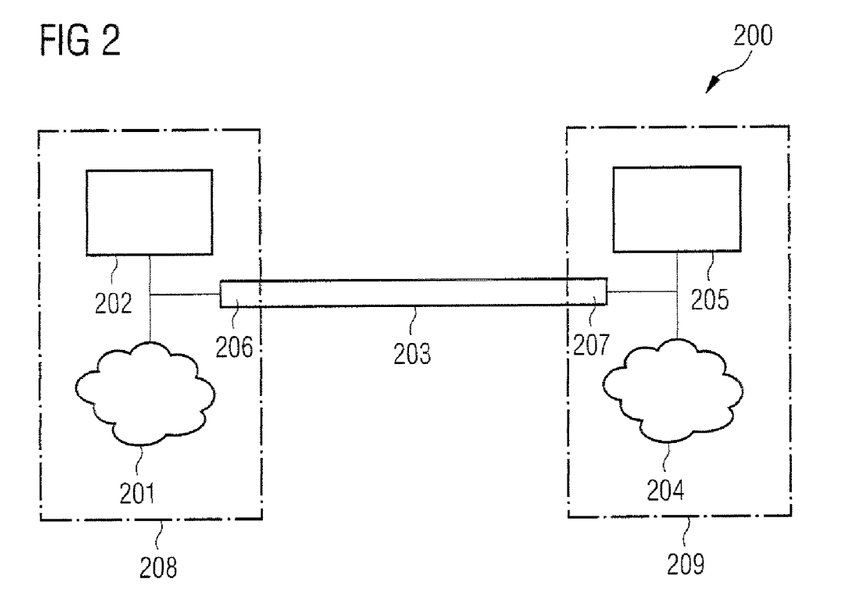
FIG. 2 shows a compression/decompression system based on an exemplary embodiment of the invention.

A compression/decompression system based on an exemplary embodiment of the invention is described in more detail below with reference to FIG. 2.

The algorithm for compression and decompression in the compression/decompression system 200 uses a respective "artificial neural network", neural network for short, for advance estimation of a data packet header field in a packet-oriented data stream from at least one preceding data packet header field in the packet-oriented data stream. The neural network is capable of largely predicting future headers (header fields) i.e. those which are yet to be transmitted and to be received, from already transmitted and received headers, i.e. those preceding the header to be transmitted in the data stream. It is therefore necessary to transmit only one piece of information about the differences in the advance estimation, i.e. proportions of the header which were not predicted exactly.

Neural networks have been known for a relatively long time. They are used primarily as a classification method, for example in the literature, and for learning patterns. Like the brain in mammals, artificial neural networks contain a number of small elements, the neurons. Information is processed by virtue of the neurons activating themselves using directional connections to one another. This takes place, in principle in similar fashion to the processes in the brain. An artificial neural network has highly idealized neurons which are connected to one another by means of synapses. The strength of the connection by synapsis is represented by a numerical value, the connection weight. A neuron sums the inputs received from input-side neurons via synapses with the respective connection weight, adopts a new activation state on the basis thereof and forwards its corresponding output to output-side neurons, likewise via synapses with the respective connection weight.

Neural networks are distinguished by their learning capability. They can learn a task using training examples without needing to be explicitly programmed for this purpose. During the learning of what is known as a back-propagation network, which has an input layer, an output layer and at least one hidden layer of neurons which is situated in between, an iterative method is used to ascertain a configuration for the connection weights in the network for which the error sum over all the training patterns is minimal.

Other advantages of neural networks are the high level of parallelism in the information processing, the high level of error tolerance and the distributed representation of knowledge, which means that when a neuron is destroyed there is only a relatively small loss of knowledge.

The compression/decompression system 200 has a first neural network 201, associated with a compression apparatus or a transmitter, and a comparison unit 202, which are connected or coupled to one another and to a transmission link 203. It also has a second neural network 204, associated with a decompression apparatus or a receiver, and a reconstruction unit 205, which are likewise connected or coupled to one another and to the transmission link 203. By way of example the transmission link 203 is an air interface between a mobile radio network and a mobile communication appliance or an Internet connection between a personal computer and a server computer.

The neural network 201 estimates a header (data packet header field) in the packet-oriented data stream to be compressed from at least one preceding header in advance. The comparison unit 202 compares the result of the advance estimation of the neural network 201 with the actual header and ascertains a piece of comparison information which indicates the difference between the advance estimation and the actual header. The piece of comparison information is sent as a compressed header by the transmitter 206 and is transmitted via the transmission link 203. In this case, the transmitter 206 can be considered to be part of the transmission link 203.

The transmitted piece of comparison information is received as a compressed header by the receiver 207 which can likewise be considered to be part of the transmission link 203. The neural network 204 estimates the header to be decompressed from at least one preceding, i.e. already received, header in advance. The reconstruction unit 205 takes the header estimated in advance using the neural network 204 and the piece of comparison information received as a compressed header and generates an actual decompressed header.

The neural network 201, the comparison unit 202 and the transmitter 206 are a compression apparatus 208 based on another exemplary embodiment of the invention.

The neural network 204, the reconstruction unit 205 and the receiver 207 (a reception unit) are a decompression apparatus 209 based on yet another exemplary embodiment of the invention.

Compression algorithms for headers (header fields), such as RFC1144, RFC2507 or RFC3095, can respectively be used only for one particular type of data traffic to which they are tailored (e.g. RFC1144 only for IPv4/TCP, RFC3095 only for RTP, ESP, UDP). They serve their purpose only for this particular type, but are not able to compress header fields from other existing or any future network protocols.

In line with one exemplary embodiment of the invention, a neural network capable of learning, for example what is known as a back-propagation network, is able to learn the compression and decompression on the basis of the data packets to be compressed, by adjusting the internal structure of the neural network in each step by minimizing the error in the advance estimation of the data packet header field.

In this case, learning means that the advance estimation is optimized such that the prediction of the individual bytes of the header is as correct as possible, and if this is not always so, that the difference is as small as possible. This means that, by way of example, it is necessary to transmit only the differences from a few bytes incorrectly estimated in advance and what is known as a difference bitmap, which indicates to the receiver which of the bytes estimated in advance differ from the real data packet.

In this case, it does not matter what header field types the data packets contain or what variation pattern in the data stream they have. This has the effect that even headers with unknown properties or headers from future network protocols, i.e. those not yet specified today, can be compressed and decompressed in this manner.

Figure 3:
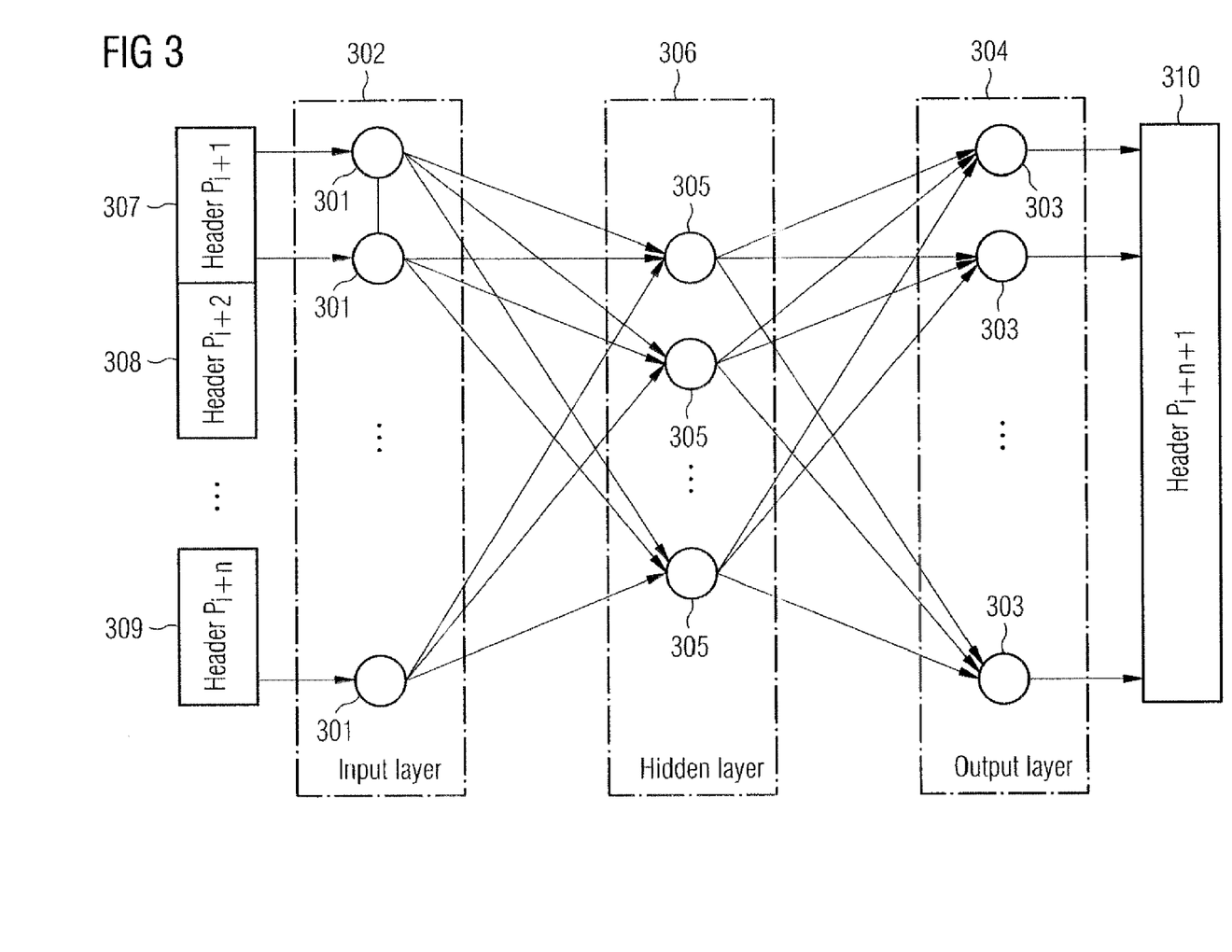
FIG. 3 shows a neural network based on an exemplary embodiment of the invention.

A neural network of the back-propagation type which is capable of learning based on an exemplary embodiment of the invention and an appropriate method sequence are explained in more detail below with reference to FIG. 3.

Consideration is given to k respective bytes of a packet in a data stream for header compression, for example, the first k bytes in each data packet, which contain one or more header fields. The last n packets, i.e. the n packets which directly precede the data packet to be compressed in the order of the data stream, will be used for learning.

The topology of the neural network is chosen using n times k input neurons 301 in the input layer "Input layer" 302 and k output neurons 303 in the output layer "Output layer" 304. In this back-propagation network, there is additionally a concealed or hidden neuron layer. The neurons 305 in the hidden layer "Hidden layer" 306 have their inputs connected to the input neurons 301 and their outputs connected to the output neurons 303.

For the purpose of advance estimation of a data packet header field (header), k respective bytes in the last n packets (packet i+1, i+2, ..., i+n) are presented to the neural network as an input pattern. The k respective bytes are taken from the header fields in the respective data packets, i.e. from "Header P i+1" 307, "Header P i+2" 308, ..., and "Header P i+n" 309. As an output pattern, the neural network delivers precisely k bytes, which are considered to be a prediction of the current packet i+n+1, i.e. an advance estimation of the relevant bytes in "Header P i+n+1" 310.

Next, the predicted packet i+n+1 is compared with the actual packet i+n+1 and the error is ascertained. This is an example of the formation of a piece of comparison information which indicates the difference between the data packet header field and the data packet header field estimated in advance using the neural network of the transmitter. This error is used to adjust the weights of the neural network in a learning step which now follows. Following the learning step, the value i is increased by 1, i.e. an advance estimation of the next packet i+n+2 in the data stream is performed and the learning is continued.

In this exemplary embodiment, the following method steps are performed by the transmitter of the data stream:
1. Take the last n packets (i+1, i+2, ..., i+n)
2. Predict the next packet i+n+1
3. Compare predicted packet i+n+1 with the actual packet i+n+1
4. Create difference bitmap (bit 0 means: byte matches, bit 1 means: byte differs)
5. Send difference bitmap and the differences in the differing bytes
6. Calculate the total error
7. Adjust weights of the back-propagation network
8. Adjust learning rate
9. Increase i by 1 and go to step 1.

The receiver of the data stream performs the following method steps:
1. Receive difference bitmap and differences in the differing bytes
2. Take the last n packets (i+1, i+2, ..., i+n)
3. Predict the next packet i+n+1
4. Add received differences and reconstruct the packet i+n+1
5. Calculate the total error
6. Adjust weights of the back-propagation network
7. Adjust learning rate
8. Increase i by 1 and go to step 1.

Since the compression is based on the n respective last, i.e. the preceding n, packets in the data stream, the first n packets are transmitted in uncompressed form at the start of the data stream.

Simulation calculations for the learning behaviour of a back-propagation network in relation to headers of packet-oriented data streams have been performed, for example with data streams of the type IP or of the type IP/UDP/RTP. By way of example, n=3 preceding data packets and k=20 or k=40 respective bytes per packet were used for the advance estimation and a hidden neuron layer containing 5 or 7 neurons was used. The error, which is defined in the back-propagation algorithm as half the sum of the square error from all the output neurons, decreased significantly in the simulation calculations after just a few learning steps and reached a permanently low level after approximately 15 to 40 learning steps.

By way of example, in one step of a simulation calculation, a header having the content "45 00 00 be 00 00 40 00 40 06 00 00 c0 a8 72 01 c0 a8 72 81" was expected and the content "45 00 00 be 00 00 40 00 40 05 00 00 c0 a8 72 01 c0 a8 72 81" was estimated in advance therefor. The header and the header estimated in advance differ in this case only in one byte (shown underlined above: 05 was predicted instead of 06). This is used to derive the following difference bitmap: "0 0 0 0 0 0 0 0 0 1 0 0 0 0 0 0 0 0 0 0". If this bitmap is transmitted, the receiver can tell that only the tenth byte cannot be predicted correctly by the neural network. The transmitter now need only transmit the difference 06−05=01 in this tenth byte: "01". Since the difference to be transmitted is usually very small as a result of this method, it is even possible to compress incorrectly predicted bytes. It is not necessary to send the whole incorrectly predicted byte, but rather a much smaller range of values suffices. In the example described, the difference 06−05=01 can be encoded in one bit. The difference bitmap and the difference in the tenth byte are an example of a piece of comparison information which indicates the difference between the data packet header field and the data packet header field estimated in advance using the neural network of the transmitter.

Figure 4:
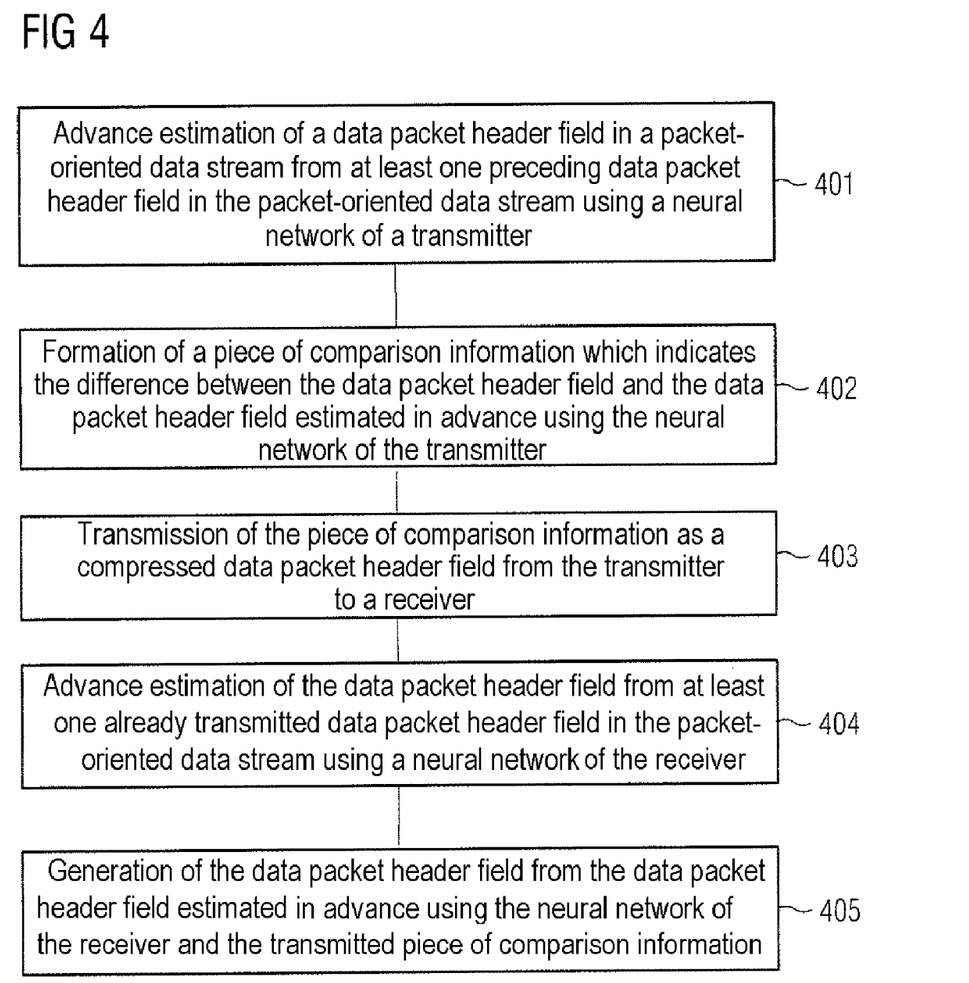
FIG. 4 shows a flowchart for a method for compressed transmission based on an exemplary embodiment of the invention.

FIG. 4 shows a flowchart for a method for the compressed transmission of data packet header fields based on an exemplary embodiment of the invention.

In 401, a data packet header field in a packet-oriented data stream is estimated in advance from at least one preceding data packet header field in the packet-oriented data stream using a neural network of a transmitter.

In 402, a piece of comparison information indicating the difference between the data packet header field and the data packet header field estimated in advance using the neural network of the transmitter is formed.

The advance estimation of a data packet header field in 401 and the formation of a piece of comparison information in 402 are simultaneously a method for compressing data packet header fields based on another exemplary embodiment.

In 403, the piece of comparison information is transmitted as a compressed data packet header field from the transmitter to a receiver. The transmission of the piece of comparison information as a compressed data packet header field may comprise the piece of comparison information being sent by the transmitter and the piece of comparison information being received by the receiver.

In 404, the data packet header field is estimated in advance from at least one already transmitted data packet header field in the packet-oriented data stream using a neural network of the receiver.

In 405, the data packet header field is generated from the data packet header field estimated in advance using the neural network of the receiver and from the transmitted piece of comparison information.

The reception of the piece of comparison information in 403, the advance estimation of the data packet header field in 404 and the generation of the data packet header field in 405 are simultaneously a method for decompressing data packet header fields based on another exemplary embodiment.

In line with one exemplary embodiment of the invention, the at least one preceding data packet header field corresponds to the at least one already transmitted data packet header field.

In line with one exemplary embodiment of the invention, the neural network of the transmitter and the neural network of the receiver are designed to generate identical output patterns when they have identical input patterns applied to them.

In line with one exemplary embodiment of the invention, the neural network of the transmitter and the neural network of the receiver have an identical arrangement of neurons and identical weights for corresponding neuron connections.

In line with one exemplary embodiment of the invention, a method comprises: learning by the neural network of the transmitter from an error which has occurred during the advance estimation of the data packet header field from the at least one preceding data packet header field on the basis of a prescribed learning specification for error reduction, and learning by the neural network of the receiver from an error which has occurred during the advance estimation of the data packet header field from the at least one already transmitted data packet header field on the basis of the same prescribed learning specification for error reduction.

In line with one exemplary embodiment of the invention, a method comprises: transmission of a control instruction which influences the behaviour of the neural network of the receiver.

In line with one exemplary embodiment of the invention, a method is carried out repeatedly in order to transmit successive data packet header fields in the packet-oriented data stream.

In line with one exemplary embodiment of the invention, a method comprises: learning by the neural network from an error which has occurred during the advance estimation of the data packet header field from the at least one preceding data packet header field on the basis of a prescribed learning specification for error reduction.

In line with one exemplary embodiment of the invention, a method comprises: learning by the neural network from an error which has occurred during the advance estimation of the data packet header field from the at least one already received data packet header field on the basis of a prescribed learning specification for error reduction.

In line with one exemplary embodiment of the invention, a method comprises: reception of a control instruction which influences the behaviour of the neural network.

In line with various exemplary embodiments of the invention, the neural network or the neural network of the transmitter and/or the neural network of the receiver is what is known as a back-propagation network.

In line with various exemplary embodiments of the invention, the neural network or the neural network of the transmitter and/or the neural network of the receiver is a neural network which is capable of learning and which has a prescribed minimum learning rate.

In line with various exemplary embodiments of the invention, the at least one preceding or already transmitted or already received data packet header field contains a plurality of data packet header fields which directly precede the data packet header field in the data stream.

In line with one exemplary embodiment of the invention, the piece of comparison information contains a difference bitmap with a respective bit for each byte of the data packet header field.

In line with one exemplary embodiment of the invention, the packet-oriented data stream is a data stream between a mobile communication appliance and a mobile radio network.

In line with one exemplary embodiment of the invention, the first neural network and the second neural network are designed to generate identical output patterns when they have identical input patterns applied to them.

In line with one exemplary embodiment of the invention, the first neural network and the second neural network have an identical arrangement of neurons and identical weights for corresponding neuron connections.

In line with one exemplary embodiment of the invention, an apparatus has: a control instruction generation unit, set up for generating a control instruction which influences the behaviour of the second neural network, wherein the transmission link is also set up for transmitting the control instruction, and a control unit, set up for influencing the behaviour of the second neural network on the basis of the transmitted control instruction.

In line with one exemplary embodiment of the invention, the neural network is a neural network which is capable of learning and which is set up for learning from an error which has occurred during the advance estimation of the data packet header field from the at least one preceding data packet header field on the basis of a prescribed learning specification for error reduction.

In line with one exemplary embodiment of the invention, an apparatus has: a control unit, set up for influencing the behaviour of the neural network on the basis of a received control instruction.

In line with one exemplary embodiment of the invention, the neural network is a neural network which is capable of learning and which is set up for learning from an error which has occurred during the advance estimation of the data packet header field from the at least one already received data packet header field on the basis of a prescribed learning specification for error reduction.

Further exemplary refinements of the invention can be found in the dependent patent claims.

In other exemplary embodiments of the invention, the inventor proposes additional extensions and modifications:

Signalling (for example, what is known as inband signalling) for transmitting additional compression commands, such as "MODIFY" (changing the network topology), "RESET" (reinitialization and fresh learning of the network) and "FEEDBACK" (positive or negative acknowledgment by the receiver to the transmitter).

The compressor uses not only a compression entity for the negotiated topology ("k, n") but also other neural networks with different topologies. These networks are likewise trained at the transmission end and are initially unknown to the receiver, for example. If it turns out that one of these networks is better suited to the current data stream, the transmitter can use this more beneficial topology in future, and the receiver can also be changed over as appropriate, for example using the "MODIFY" command.

Definition of fixed values for the weights in the case of particular data streams. In this context, the learning phase is dispensed with completely and a predefined, already trained neural network is used both at the transmission end and at the receiver end. This roughly corresponds to a profile for a particular data stream. These networks can be optimized beforehand in trials and then standardized, for example, even relatively simply.

Predefined neural networks can be used to encrypt headers when only the transmitter and the associated receiver authorized for reception know this network. An attacker who is not authorized to receive, as the so-called "man in the middle" (i.e. who is eavesdropping on the transmission link) therefore has less chance of decrypting the compressed header stream.

In customary back-propagation networks, the changes in the weights of the neuron connections decrease progressively with the learning rate, i.e. the learning phase is in effect limited in terms of time or in terms of the number of learning steps. However, to allow the neural network to always learn new header types flexibly still, even after relatively long use, it is possible not to allow the learning rate to fall below a particular minimum.

If packets in a data stream have a long-term or long-distance correlation, it is possible not only to consider the last n packets for the advance estimation but also, instead or in addition, to resort to a few packets which are further back in time or in the order of the data stream.

In the case of the 3GPP ("3rd Generation Partnership Project") mobile radio generation, headers in the data traffic between a mobile communication appliance and an entity of the mobile radio network, for example what is known as the SGSN ("Serving GPRS Support Node"), can be compressed and decompressed using neural networks, i.e. in the form of "neural compression". In this case, various parameters, such as algorithm type, number of packets considered as an input pattern, number of bytes per packet and number of hidden neurons, can be arranged in a negotiation phase (what is known as "XID negotiation").

The invention claimed is:

1. Method for the compressed transmission of data packet header fields in a packet-oriented data stream, comprising:
   estimating in advance a data packet header field in a packet-oriented data stream from at least one preceding data packet header field in the packet-oriented data stream using a neural network of a transmitter;
   forming a piece of comparison Information which indicates the difference between the data packet header field and the data packet header field estimated in advance using the neural network of the transmitter;
   transmitting the piece of comparison Information as a compressed data packet header field from the transmitter to a receiver;
   estimating in advance the data packet header field from at least one already transmitted data packet header field in the packet-oriented data stream using a neural network of the receiver; and
   generating the data packet header field from the data packet header field estimated in advance using the neural network of the receiver and from the transmitted piece of comparison information.

2. Method according to claim 1, wherein the at least one preceding data packet header field corresponds to the at least one already transmitted data packet header field.

3. Method according to claim 1, wherein the neural network of the transmitter and the neural network of the receiver are designed to generate identical Output patterns when they have identical input patterns applied to them.

4. Method according to claim 1, wherein the neural network of the transmitter and the neural network of the receiver have an identical arrangement of neurons and identical weights for corresponding neuron connections.

5. Method according to claim 1, further comprising:
   learning by the neural network of the transmitter from an error which has occurred during the advance estimation of the data packet header field
   from the at least one preceding data packet header field on the basis of a prescribed learning specification for error reduction; and
   learning by the neural network of the receiver from an error which has occurred during the advance estimation of the data packet header field from the at least one already transmitted data packet header field on the basis of the same prescribed learning specification for error reduction.

6. Method according to claim 1, further comprising:
   transmitting a control instruction which influences the behaviour of the neural network of the receiver.

7. Method according to claim 1, wherein the neural network of the transmitter is what is known as a back-propagation network.

8. Method according to claim 1, wherein the neural network of the receiver is what is known as a back-propagation network.

9. Method according to claim 1, wherein the neural network of the transmitter is a neural network which is capable of learning and which has a prescribed minimum learning rate.

10. Method according to claim 1, wherein the neural network of the receiver is a neural network which is capable of learning and which has a prescribed minimum learning rate.

11. Method according to claim 1, wherein the at least one preceding data packet header field includes a plurality of data packet header fields which directly precede the data packet header field in the data stream.

12. Method according to claim 1, wherein the piece of comparison Information includes a difference bitmap with a respective bit for each byte of the data packet header field.

13. Method according to claim 1, wherein the packet-oriented data stream is a data stream between a mobile communication appliance and a mobile radio network.

14. Method for compressing data packet header fields in a packet-oriented data stream, comprising:
   estimating in advance a data packet header field in a packet-oriented data stream from at least one preceding data packet header field in the packet-oriented data stream using a neural network; and forming a piece of comparison Information which indicates the difference between the data packet header field and the data packet header field estimated in advance, as a compressed data packet header field.

15. Method for decompressing data packet header fields in a packet-oriented data stream, comprising;
   receiving a piece of comparison information as a compressed data packet header field in a packet-oriented data stream;
   estimating in advance the data packet header field from at least one already received data packet header field in the packet-oriented data stream using a neural network; and
   generating the data packet header field from the data packet header field estimated in advance and the received piece of comparison information.

16. Method according to claim 15, further comprising:
   receiving a control instruction which influences the behaviour of the neural network.

17. A device for transmitting and receiving a packet-oriented data stream, the device configured to perform at least one of compression or decompression, the device, comprising:
   a first neural network for the advance estimation of a data packet header field in a packet-oriented data stream from at least one preceding data packet header field in the packet-oriented data stream;
   a comparison unit for forming comparison information indicating the difference between the data packet header field and the data packet header field estimated in advance using the first neural network;
   a transmission link for transmitting the comparison information as a compressed data packet header field;
   a second neural network for the advance estimation of the data packet header field from at least one already transmitted data packet header field in the packet-oriented data stream; and
   a reconstruction unit for generating the data packet header field from the data packet header field estimated in advance using the second neural network and from the transmitted piece of comparison information.

18. The device according to claim 17, wherein the first neural network and the second neural network are configured to generate identical output patterns when they have identical input patterns applied to them.

19. The device according to claim 17, wherein the first neural network and the second neural network have an identical arrangement of neurons and identical weights for corresponding neuron connections.

20. The device according to claim 17, further comprising:
   a control instruction generation unit, configured for generating a control instruction which influences the behaviour of the second neural network,
   wherein the transmission link is also configured for transmitting the control instruction; and
   a control unit, configured for influencing the behaviour of the second neural network on the basis of the transmitted control instruction.

21. A device for transmitting and receiving a packet-oriented data stream, the device configured to perform data packet header field compression, the device comprising:
   a neural network, set up for the advance estimation of a data packet header field in a packet-oriented data stream from at least one preceding data packet header field in the packet-oriented data stream; and
   a comparison unit, set up for forming a piece of comparison information which indicates the difference between the data packet header field and the data packet header field estimated in advance, as a compressed data packet header field.

22. A device for transmitting and receiving a packet-oriented data stream, the device configured to perform data packet header field decompression, the device comprising:
   a reception unit for receiving a piece of comparison information as a compressed data packet header field in a packet-oriented data stream;
   a neural network for the advance estimation of the data packet header field from at least one already received data packet header field in the packet-oriented data stream; and
   a reconstruction unit for generating the data packet header field from the data packet header field estimated in advance and the received piece of comparison information.

23. The device according to claim 22, further comprising:
   a control unit configured for influencing the behaviour of the neural network on the basis of a received control instruction.

* * * * *